United States Patent Office 3,426,052
Patented Feb. 4, 1969

3,426,052
FIVE MEMBERED ZIRCONIUM, BORON, THALLIUM AND GOLD HETEROCYCLIC COMPOUNDS
Karl W. Hubel and Emile H. Braye, Brussels, Belgium, assignors to Union Carbide Corporation, a corporation of New York
No Drawing. Continuation-in-part of application Ser. No. 18,805, Mar. 31, 1960. This application June 15, 1960, Ser. No. 36,132
Claims priority, application Great Britain, Apr. 7, 1959, 11,679/59
U.S. Cl. 260—429         7 Claims
Int. Cl. C07f 1/12, 7/00, 5/02

This invention relates to novel organic compounds and more particularly to novel five-membered heterocyclic compounds.

This application is a continuation-in-part of our copending application Ser. No. 18,805, filed Mar. 31, 1960, and now U.S. Patent No. 3,280,017, entitled, "Process for the Preparation of Hetero-Atom Containing Organic Compounds and Products Resulting Therefrom."

The compounds of this invention can be conveniently represented by the following general formula:

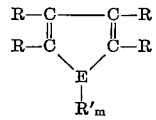

wherein R represents a member selected from the class consisting of hydrogen, and the hydroxyl, halogeno, carboalkoxy, substituted and unsubstituted alkyl, substituted and unsubstituted aryl, cycloaliphatic, alkoxy, phenoxy, and silyl groups, E represents an element selected from the group consisting of gold, zinc, cadmium, mercury, boron, aluminum, gallium, indium, thallium, the lanthanides, silicon, germanium, tin, lead, titanium, zirconium, hafnium, phosphorus, arsenic, antimony, bismuth, vanadium, niobium, tantalum, iron, cobalt, nickel, platinum and palladium; R' is hydrogen, and the hydroxyl, halogeno, carboalkoxy, substituted and unsubstituted alkyl, substituted and unsubstituted aryl, cycloaliphatic, alkoxy, phenoxy, silyl, cyclobutadienyl, and cyclopentadienyl groups; and $m$ represents an integer having a value of from 0 to 2.

It is to be understood that the presence of an $R'_m$ group will be determined by the remaining unfilled valency, if any of E, i.e. the representation of $m$ may be expressed as $m$=valency of E–2.

Among those compounds preferred in the practice of this invention are those in which R is a lower alkyl or phenyl group, E is gold, mercury, boron, thallium, silicon, and zirconium, and R' is a halogen, a lower alkyl, a phenyl or a cyclopentadienyl group. It should be noted that the oxides and other derivatives of these and the other novel compounds of this invention can also be prepared with facility and such are, therefore, within the scope of this invention.

The heterocyclic systems prepared employing the process of this invention are important intermediates for many organic systems. For example, they may be used in the preparation of dyes, pigments, pharmaceuticals, or for the preparation of organo-metallic complexes in a manner similar to that disclosed in copending application Ser. No. 784,040, filed in the names of K. W. Hubel and E. Weiss, and now abandoned.

In addition, many of the five-membered heterocyclic compounds are strongly fluorescent materials and may be employed as such. Exemplary of such fluorescent heterocyclic systems are the arsoles, phospholes, stiboles, and siloles. In this regard, these compounds generally exhibit a yellow green, fluorescence comparable to that of zinc or cadmium sulfides. The fluorescent spectrum can be often shifted to the corresponding oxide thereby making it possible to variably provide a fluorescent compound and the particular fluorescent spectrum desired.

The hetero-containing compounds of this invention also behave as dienes and can, therefore, be involved in Diels-Alder reactions. For example, the reaction of pentaphenylphosphole with the dimethyl ester of acetylene dicarboxylic acid yields the dimethyl ester of tetraphenylphthalic acid in almost quantitative amounts. A normal adduct is also obtained by Diels-Alder addition with maleic anhydride.

Another general use for the metal containing compounds prepared by the process of this invention is as anti-knock additives in motor fuels either alone or in conjunction with other organo-metallic compounds. They could also be used as metal-plating agents. For this use the metal containing compounds obtainable by the process of this invention are contacted with a platable substrate at a temperature above the decomposition temperature of the metal containing compound, either in solution or in a vapor phase. A platable substrate will be, for instance, glass cloth, a metal or a plastic surface or the like.

The novel compounds of this invention can be prepared by the process described in copending applications Ser. No. 18,805, filed in the names of K. W. Hubel and E. H. Braye, filed Mar. 31, 1960, now U.S. Patent No. 3,280,017; Ser. No. 36,131, filed concurrently herewith, in the names of K. W. Hubel and E. H. Braye, now U.S. Patent No. 3,149,101; and Ser. No. 36,130, filed concurrently herewith in the names of K. W. Hubel, E. H. Braye and I. Caplier, now U.S. Patent No. 3,151,140, the descriptions thereof being incorporated herein by reference. The reactions disclosed in these copending applications shall be hereinafter designated, for convenience only, as Process A, Process B and Process C.

Generally speaking, Process A comprises the reaction of an organo-metallic complex having the formula: $M_x(CO)_y(R'C_2R'')_z(Q)_w$ with an element belonging to Groups III–A, IV–A, V–A or VI–A of the Periodic Table, or a compound containing at least one of the elements of those Groups. In the above referred to organo-metallic complexes, M represents a transition metal belonging to the VI, VII or VIII sub-groups of the Periodic Table, CO represents a carbonyl group, R' and R" may be the same or different and represent hydrogen, halogeno, carboalkoxy, alkyl, aryl, cycloaliphatic, alkoxy, or silyl groups and the like, including the substitued derivatives thereof, $C_2$ represents a carbon to carbon bonding, Q represents a member selected from the group consisting of hydrogen, mercury, halogen, alkyl, aryl or acyl, $x$ represents an integer of from 1 to 4, $y$ represents an integer from 1 to 10, $z$ represents an integer of from 1 to 6, and $w$ represents an integer of from 0 to 4. It is to be noted that Process A is useful for the preparation of the aforesaid elements of Groups III–A, IV–A, V–A or VI–A of the Periodic Table.

Generally speaking, Process B comprises the reaction of a butadiene derivative having the formula:

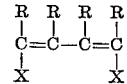

wherein X represents a halogen and wherein R represents a member selected from the class consisting of hydrogen, and alkyl and aryl groups; with a reactant represented by the formula:

wherein A represents a member selected from the group consisting of an alkali metal, and an alkaline earth metal; E represents an element selected from the group consisting of gold, zinc, cadmium, mercury, boron, aluminum, gallium, indium, thallium, the lanthanides, silicon, germanium, tin, lead, titanium, zirconium, hafnium, nitrogen, phosphorus, arsenic, antimony, bismuth, vanadium, niobium, tantalum, oxygen, sulfur, selenium, tellurium, iron, cobalt, nickel, palladium, and platinum; R' represents a member selected from the class consisting of hydrogen and alkyl and aryl groups; $x$ is an integer having a value of from 1 to 2; and $y$ is an integer having a value of from 0 to 4.

Generally speaking, Process C comprises a reaction of a 1,4-dilithio butadiene with a reactant represented by the formula:

$$(Q)_xE(R)_y(R')_w$$

wherein Q represents a member selected from the class consisting of halogens, hydroxy, alkoxy, and phenoxy groups; E represents an element selected from the group consisting of gold, zinc, cadmium, mercury, boron, aluminum, gallium, indium, thallium, the lanthanides, silicon, germanium, tin, lead, titanium, zirconium, hafnium, nitrogen, phosphorus, arsenic, antimony, bismuth, vanadium, niobium, tantalum, oxygen, sulfur, selenium, tellurium, iron, cobalt, nickel, palladium, and platinum; R represents a member selected from the class consisting of substituted and unsubstituted alkyl, aryl, cyclopentadienyl, phosphino, cyclobutadienyl and cyclooctatetraenyl groups; R' represents a member selected from the class consisting of oxygen, sulfur, selenium, tellurium, and a carbonyl group; $x$ is an integer having a value of from 1 to 4; $y$ is an integer having a value of from 0 to 4; $w$ is an integer having a value of from 0 to 2.

The reaction conditions essential for each of these processes are more clearly defined in each of the three co-pening applications. However, these processes are generally carried out employing at least stoichiometric amounts of the reactants in polar or non-polar organic solvents. The reaction employing the organo-metallic complex as starting material, i.e. Process A, is generally carried out at temperatures of between −60° C. and 250° C. The process employing the dihalogeno starting material, i.e. Process B, is usually carried out at a temperature of between −40° C. and 300° C. The process employing the dilithio starting material, i.e. Process C, is usually carried out at a temperature of between −50° C. and 200° C.

Typical compounds representative of the novel compounds of this invention include:

pentaphenylphosphole
P.phenyl-phosphole
P.phenyl-P.sulfide-tetraphenylphosphole
P.benzyl-tetraphenyl-phosphole and the oxide thereof
P.methyl-P. oxide-tetraphenylphosphole
pentaphenylarsole
B.chloro-tetraphenylborole
pentaphenylstibole and the oxide thereof
pentaphenylbismuthole
Al.methyl-aluminole
hexaphenylsilole
In.methyl-tetraphenyllindiole
Si.diphenyl-silole
tetraphenyl-mercurole
tetraethyl-mercurole
Zr. bis(cyclopentadienyl)-tetraphenyl-zirconole
Au.chloro-tetraphenyl-aurole
Au.chloro-tetramethyl-aurole
pentaphenyl-borole
pentaphenyl-thallole
hexaphenyl-stannole
tetraphenyl-zincole
tetraphenyl-cadmiole
Ge.dimethyl-tetraphenyl-germanole
hexaphenyl-plumbole Ti.bis(cyclopentadienyl)-tetraphenyl-titanole
Hf.bis(cyclopentadienyl)-tetraphenyl-hafniole The following examples serve to illustrate the practice of this invention further.

EXAMPLE I 1 g. of $Fe_2(CO)_6(C_6H_5C_2C_6H_5)_2$ and 5 ml. of $$C_6H_5PCl_2$$

were heated for 30 minutes at about 140° C. A pale yellow organic substance having a M.P. of 255–256° C. was obtained in a 66% yield. Analysis showed that this compound has a formula $C_{34}H_{25}P$.

*Analysis.*—Theoretical calculated for $C_{34}H_{25}P$: C, 87.93; H, 5.43; P. 6.68. Found: C, 87.47; H, 5.27; P, 6.34.

EXAMPLE II 1 g. (1.5 ml.) $Fe_2(CO)_6(C_6H_5C_2C_6H_5)_2$, 0.4 ml. (3 ml.) $C_6H_5CH_2PBr_2$ and 20 ml. $C_6H_6$ were heated for 15 hours at 170° C. in a sealed tube. Besides 0.14 gram $Fe(CO)_3(C_6H_5C_2C_6H_5)_2$ and 0.09 grams tetracyclone, 0.07 gram of a yellow-, strongly fluorescent P-benzyl-P-oxide-tetraphenyl-phosphole having an M.P. of 220–227° C. was isolated by chromatography. This phosphole-oxide was formed by air oxidation of the primarily formed P-benzyl-tetraphenyl-phosphole.

*Analysis.*—Theoretical calculated for $C_{35}H_{27}OP$: C, 85.01; H, 5.10. Found: C, 84.35; H, 5.46.

EXAMPLE III

A solution of 1.46 grams (2.3 mM.) (millimoles) $Fe_2(CO)_6(C_6H_5C_2C_6H_5)_2$ and 1.5 ml. $C_6H_5AsCl_2$ in 200 ml. $CH_2Cl_2$ was irradiated for 22 hours in a quartz vessel at about 30° C. with a 125 W. high-pressure-Hg-lamp. By chromatography on $Al_2O_3$, 0.03 gram penta-phenyl-arsole, a yellow fluorescent compound, of M.P. 213–214.5° C. was isolated. Some tetracyclone was also recovered.

*Analysis.*—Theoretical calculated for $C_{34}H_{25}As$: C, 80.30; H, 4.96. Found: C, 80.46; H, 4.88.

Penta-phenyl-arsole was also obtained by using $$Fe_2(CO)_5 \cdot P(C_6H_5)_3 \cdot (C_6H_5C_2C_6H_5)_2$$

as starting material.

EXAMPLE IV 0.6 g. Na (4 × 6.55 mM.) was dispersed in 50 ml. mesitylene; at 100° C., one added 1.17 g. (6.55 mM.) $C_6H_5PCl_2$ and the mixture was refluxed for one hour, forming a fine suspension of $C_6H_5PNa_2$. (6.55 mM.) 1,4-diiodotetraphenyl-butadiene was then added and refluxing was continued for 7 hours. The reaction mixture was washed with water and the organic layer chromatographed on silicagel. The products were:

pentaphenyl-phosphole (88% based on reacted diodide)
pentaphenyl-phosphole-oxide
unreacted 1,4-diiodo-tetraphenyl-butadiene.

The pentaphenyl-phosphole may be represented by the structure

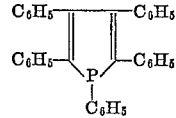

EXAMPLE V

The amalgam formed by dissolving 1 g. of sodium in 10 ml. of mercury under toluene, was shaken for 14 hours at room temperature with 5 g. of diiodo-tetraphenyl-butadiene in about 50 ml. toluene. Following the procedure of Example IV a mercury-containing compound was formed which may be represented by the following structure

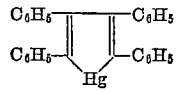

EXAMPLE VI (A)

The dilithio butadiene starting material may be prepared by the following procedure: 3 g. (16.9 mM.) diphenylacetylene and 0.6 g. clean lithium shavings were shaken in 8 ml. dry diethylether in an inert atmosphere (nitrogen). After an induction period varying between ten and twenty minutes, the reaction mixture became brownish red. Shaking was continued for one to two hours. In some cases, the 1,4-dilithio-tetraphenylbutadiene precipitated out. Fifty ml. dry ether was added and the floating Li-shavings were removed mechanically; the mixture was thereupon cooled at about −40° C.

EXAMPLE VI (B)

A suspension of 1,4 - dilithio-1,2,3,4-tetraphenylbutadiene was prepared from 18 g. (10 mM.) diphenylacetylene, according to the procedure of Example VI-A. The volume of the reaction mixture was brought to 500 ml. by adding dry ether. Under stirring, a solution of 10 ml. (about 73 mM.) phenyldichloro-phosphine in 100 ml. ether was added slowly. After another 5 min. stirring, 50 ml. water was added. The fine yellow precipitate was filtered off, and washed with methanol and ether. A yield of 14.46 g. (62%) of pentaphenylphosphole (M.P.: 255–256.5) was obtained. This may be represented by the structure

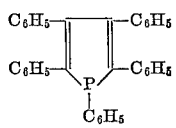

EXAMPLE VII 5.4 g. $C_6H_5$-P(S)$Cl_2$ was dissolved in 50 ml. ether. A suspension of 1,4 - dilithio-1,2,3,4-tetraphenylbutadiene prepared from 5 g. tolane (as in Example VI-A) was then slowly added. Beside pentaphenylphosphole, one isolated pentaphenylphosphole-sulfide (M.P. 196°), identical with the compound obtained from the sulfuration of pentaphenylphosphole.

*Analysis.*—Theoretical calculated for $C_{34}H_{25}PS$: C, 82.23; H, 5.08; P, 6.24; S, 6.45. Found: C, 82.11; H, 5.31; P, 6.29; S, 6.10.

This substance may also crystallize with one mole methylene chloride, which is lost at 100–120° C.

EXAMPLE VIII

To a suspension of 1,4-dilithio-1,2,3,4-tetraphenylbutadiene, prepared from 2 g. (11.25 mM.) and Li in accordance with the procedure of Example VI-A, a solution of 1.5 ml. $C_6H_5CH_2PCl_2$ (about 10 mM.) was added. After 15 min. water was added, the organic layer dried, evaporated, and the residue taken up in benzene. This solution was chromatographed over aluminum oxide.

Elution with benzene yielded 0.85 g. (32%) P-benzyltetraphenylphosphole, crystallizing into yellow, strongly fluorescent leaflets, of M.P. 203–213° (microsc.), 190° (Kifler hot stage).

*Analysis.*—Theoretical calculated for $C_{35}H_{27}P$: C, 87.86; H, 5.27. Found: C, 87.06–87.00; H, 5.64–5.56.

Elution with ethyl acetate yielded in small amounts the corresponding oxide which crystallized in needles (from petroleum ether) or leaflets (from diethylether or petroleum ether), M.P.: 228–230° C.

*Analysis.*—Theoretical calculated for $C_{35}H_{27}OP$: C, 85.01; H, 5.10. Found: C, 84.35; H, 5.46.

EXAMPLE IX

The same di-lithium-compound obtained from 2 g. diphenyl-acetylene was treated as in Example VII with 1 ml. $CH_3PI_2$. By chromatography, P-methyl-P-oxide-tetraphenylphosphole, a slightly fluorescent and pale yellow product of M.P.: 240.5–241.5° C. (from chloroform and ether) was obtained.

*Analysis.*—Theoretical calculated for $C_{29}H_{23}OP$: C, 83.22; H, 5.54. Found: C, 82.79; H, 5.44.

EXAMPLE X

To a suspension of 1,4-dilithio-tetraphenyl-butadiene prepared according to Example VI-A, from 5 g. diphenylacetylene, 2 ml. $C_6H_5AsCl_2$ was added. After addition of water, a greenish yellow precipitate was filtered off, and washed with alcohol and ether. This product (4.0 g.: 56% based on diphenylacetylene) is strongly fluorescent, melts at 213–214.5° C. and was identified according to analysis and I.R. spectra, as penta-phenyl-arsole. This compound may be represented by the structure:

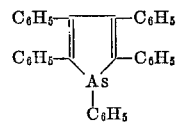

*Analysis.*—Theoretical calculated for $C_{34}H_{25}AS$: C, 80.30; H, 4.96. Found: C, 79.22; H, 4.77.

EXAMPLE XI

To a suspension of 1,4-dilithio-1,2,3,4-tetraphenylbutadiene, 1.84 g. $C_6H_5SbCl_2$, dissolved in about 50 ml. dry ether, was added. The reaction mixture was refluxed for 5 hours. After addition of water, the organic products were extracted with benzene, the dried organic layer evaporated and the residue, dissolved in benzene, was chromatographed on silicagel. The fraction eluted with a mixture of benzene/petroleum ether, yielded 0.8 g. (14.4%) of big greenish yellow crystals of M.P. 162–170° C. (decomposition).

The I.R. spectra showed analogy with the corresponding phosphor- and arsenic-heterocyclic compounds and was also fluorescent (greenish shade). This compound was fairly easily oxidized in solution. The corresponding yellow oxide was not fluorescent and melted under decomposition at 250–255° C.

*Analysis.*—Theoretical calculated for $C_{34}H_{25}OSb$: C, 71.47; H, 4.41; O, 2.80. Found: C, 72.12; H, 4.65; O, 2.74.

EXAMPLE XII

To a suspension of 1,4-dilithio-1,2,3,4-tetraphenylbutadiene prepared from 9 g. (50 mM.) diphenylacetylene, 300 ml. pure tetrahydrofurane (T.H.F.) and 5.2 ml. (6.3 g.=25 mM.) diphenyl-dichloro-silane were added. The diethylether was distilled off and the reaction mixture refluxed for four hours. Water and benzene were thereupon added. 6.7 g. (50%) pale greenish yellow strongly fluorescent crystals were obtained with M.P.: 190–191° C. (from isopropanol). The structure may be called hexaphenyl-silole and may be represented as follows:

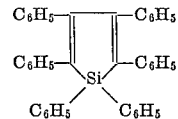

*Analysis.*—Theoretical calculated for $C_{40}H_{30}Si$: C, 89.18; H, 5.61; Si, 5.21. Found: C, 88.97; H, 5.67; Si, 5.22.

EXAMPLE XIII 2 g. (7.4 mM.) $HgCl_2$, dissolved in 100 ml. ether, were added slowly and under cooling to a suspension of 1,4-dilithio-tetraphenylbutadiene, prepared from 3 g. (16.9 mM.) tolane, in ether.

Following the procedure previously outlined, minor amounts of tetraphenylbutadine and, in a good yield, a yellow compound of M.P.: 188–190° C. (from $CH_2Cl_2$ and ethanol) was obtained. This product contained a great percentage of mercury; its I.R. spectrum, analysis and M.P. indicate a structure which may be represented as follows:

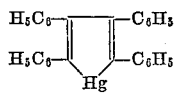

*Analysis.*—Theoretical calculated for $C_{28}H_{20}Hg$: C, 60.27; H, 3.62. Found: C, 55.32; H, 3.28.

EXAMPLE XIV 1.6 g. bis-cyclopentadienyl-zirconium dichloride, dissolved in the necessary amount of ether, was added to a suspension of the above-mentioned di-lithium-compound prepared from 3 g. tolane. Orange square plates crystallized out immediately with LiCl. The mixture was filtered, washed quickly with water and immediately dried in vacuum. The yield varied between 45% and 65%. Alcoholysis or hydrolysis yielded cyclopentadiene, tetraphenylbutadiene and zirconium oxide. The compound, which decomposes at 140–170° C. may be represented as follows:

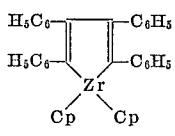

[Cp=cyclopentadienyl]

EXAMPLE XV

A solution of 0.77 g. $AuCl_3$, dissolved in 200 ml. ether, was added to Li—CPh=CPh—CPh=CPh—Li. After 1 hour reflux, the reaction mixture was filtered off, the filtrate evaporated and the residue, dissolved in a minimum amount of benzene, chromatographed on silica gel. The fraction eluted with benzene yielded yellow brown crystals, which after recrystallization from $CH_2Cl_2$, gave needles of M.P. 185–192° (decomposition). This compound contained chlorine and the content of gold, estimated by X-Ray fluorescence, indicated a percentage of about 30%.

The structure may be represented as follows:

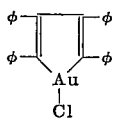

EXAMPLE XVI 1.6 ml. $C_6H_5BCl_2$, dissolved in 20 ml. ether, was added to an ethereal (30 ml.) suspension of the di-lithium-compound prepared from 3.6 g. diphenylacetylene. The reaction mixture was kept 20 hours at room temperature and then filtered. The filtrate was evaporated to dryness, the residue taken up in benzene, and chromatography on silicalgel yielded among others, 26.5 g. of a yellow product of M.P. 150–155° C.

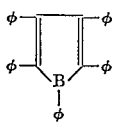

*Analysis.*—Theoretical calculated for $C_{34}H_{25}B$: C, 91.89; H, 5.67; B, 2.44. Found: C, 92.16; H, 6.04; B, (diff.).

EXAMPLE XVII

By reacting $C_6H_5TlCl_2$ in accordance with the procedure previously outlined with Li—CPh=CPh—CPh=CPh—Li pentaphenylthallole was obtained which had a faintly yellow color. The structure may be represented as follows:

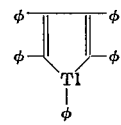

M.P. 165–169 (decomp.).

*Analysis.*—Theoretical calculated for $C_{34}H_{25}Tl$: C, 64.0; H, 3.95. Found: C, 62.12; H, 3.83.

EXAMPLE XVIII

To an ethereal solution of 1,4-dilithiotetraphenylbutadiene, prepared from 3 g. diphenylacetylene, 3 g. $Ph_2SnCl_2$ (50% excess), dissolved in 50 ml. ether, were added. After the vigorous reaction has ceased, water is added and the reaction mixture is treated according to previous methods. Hexaphenylstannole (slightly fluorescent yellow greenish crystals) of M.P. 172–3° C. was obtained in a yield of 2.15 g. (40% based on tolane).

*Analysis.*—Theoretical calculated for $C_{40}H_{30}Sn$: C, 76.33; H, 4.81. Found: C, 75.98; H, 4.65.

What is claimed is:
1. P-sulfide-pentaphenylphosphole.
2. P. methyl-P. oxide-tetraphenylphosphole.
3. Zr. bis(cyclopentadienyl)-tetraphenyl-zirconole.
4. Au-chloro-tetraphenyl-aurole.
5. Pentaphenyl-borole.
6. Pentaphenyl-thallole.
7. As a new composition of matter, a five-membered heterocyclic compound having the formula

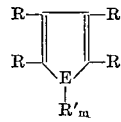

wherein R represents aryl; E represents zirconium; R' is selected from the class consisting of phenyl, benzyl, cyclopentadienyl, halogeno, and alkyl; and *m* represents an integer having a value of the valence of E minus two with a maximum value of two.

References Cited

UNITED STATES PATENTS 2,160,915 6/1939 Schreiber _____ 260—440
2,468,769 5/1949 Morris et al. _____ 260—429

OTHER REFERENCES

Leavitt et al.: J.A.C.S. 81, No. 12, pages 3163–3164, June 20, 1959.

Patterson et al.: "The Ring Index" (1940) pages 43 and 44, Pub. by Reinhold Pub. Corp. (N.Y.) A.C.S. Monograph Series.

Krause et al.: "Die Chemie der metall-organischen Verbindungen," Published by Verlag von Gebruder Borntraeger (1937), pages 364, 565, 567, 570, 634 and 635.

Brady: "Science Progress," vol. 16, part 2, pages 542–547.

Mann: "The Chemistry of Heterocyclic Compounds," 1950, page 25 relied on. Published by Interscience Publishers, Inc., N.Y.

HELEN M. McCARTHY, *Primary Examiner.*

W. F. W. BELLAMY, *Assistant Examiner.*

U.S. Cl. X.R.

106—292, 297, 299, 301, 303, 304; 252—301.3, 386; 260—429.2, 429.3, 429.5, 429.7, 429.9, 430, 431, 437, 439, 440, 446, 447, 448, 448.2, 606.5